(12) United States Patent
Uriu et al.

(10) Patent No.: US 7,904,030 B2
(45) Date of Patent: Mar. 8, 2011

(54) HIGH FREQUENCY SWITCH, RADIO COMMUNICATION APPARATUS, AND HIGH FREQUENCY SWITCHING METHOD

(75) Inventors: Kazuhide Uriu, Osaka (JP); Toru Yamada, Osaka (JP); Hideaki Nakakubo, Kyoto (JP); Masaharu Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 10/472,309

(22) PCT Filed: Mar. 27, 2002

(86) PCT No.: PCT/JP02/02951
§ 371 (c)(1),
(2), (4) Date: Mar. 26, 2004

(87) PCT Pub. No.: WO02/080388
PCT Pub. Date: Oct. 10, 2002

(65) Prior Publication Data
US 2004/0171356 A1    Sep. 2, 2004

(30) Foreign Application Priority Data

Mar. 29, 2001 (JP) ................................ 2001-096774

(51) Int. Cl.
*H04B 1/44* (2006.01)
(52) U.S. Cl. ....... 455/83; 455/73; 455/552.1; 455/553.1; 333/101; 333/134; 333/103; 333/174; 333/175
(58) Field of Classification Search ............ 455/73, 455/78, 82–84, 134, 186.1, 552–553; 333/101, 333/134, 103–104, 174–175
See application file for complete search history.

(56) References Cited

U.S. PATENT DOCUMENTS

| | | | | |
|---|---|---|---|---|
| 4,378,536 A | * | 3/1983 | Schwarzmann | 333/81 R |
| 4,612,571 A | * | 9/1986 | Moon | 725/149 |
| 6,060,960 A | * | 5/2000 | Tanaka et al. | 333/104 |
| 6,165,866 A | * | 12/2000 | Kobayashi | 438/396 |
| 6,417,461 B1 | * | 7/2002 | Hirahara et al. | 174/256 |
| 6,442,376 B1 | | 8/2002 | Furutani et al. | |
| 6,448,868 B2 | * | 9/2002 | Kato et al. | 333/103 |
| 6,560,444 B1 | * | 5/2003 | Imberg | 455/78 |
| 6,633,748 B1 | * | 10/2003 | Watanabe et al. | 455/78 |

(Continued)

FOREIGN PATENT DOCUMENTS

EP    0 998 035    5/2000

(Continued)

OTHER PUBLICATIONS

International Search Report corresponding to application No. PCT/JP02/02951 dated Feb. 13, 2003.

(Continued)

*Primary Examiner* — Zhiyu Lu
(74) *Attorney, Agent, or Firm* — RatnerPrestia

(57) ABSTRACT

For example, in a conventional high frequency switch used for a mobile phone and so on, high frequency distortion is caused by a diode which is turned off upon transmission. A high frequency switch includes a switch circuit for switching transmission and reception performed via a transmitting terminal and receiving terminals, said switch circuit having a diode turned off upon transmission, and a low-pass filter for suppressing high frequency distortion caused by the diode upon transmission.

6 Claims, 18 Drawing Sheets

U.S. PATENT DOCUMENTS

| | | | |
|---|---|---|---|
| 6,987,984 B1 * | 1/2006 | Kemmochi et al. | 455/552.1 |
| 7,003,312 B2 * | 2/2006 | Kemmochi et al. | 455/552.1 |
| 2002/0127973 A1 | 9/2002 | Furutani et al. | |

FOREIGN PATENT DOCUMENTS

| | | |
|---|---|---|
| EP | 1 003 291 | 5/2000 |
| JP | 10-032521 | 2/1998 |
| JP | 11-274876 | 10/1999 |
| JP | 2000-165274 | 6/2000 |
| JP | 2000-183780 | 6/2000 |
| JP | 2000-201097 | 7/2000 |
| JP | 2002-208872 | 7/2002 |
| WO | WO 00/38341 | 6/2000 |
| WO | WO 02/01741 | 1/2002 |

OTHER PUBLICATIONS

Shin'ya Nakai, "The Hotline", vol. 21, Apr. 1998 (with partial English translation).

* cited by examiner

HIGH FREQUENCY SWITCH, RADIO COMMUNICATION APPARATUS, AND HIGH FREQUENCY SWITCHING METHOD

THIS APPLICATION IS A U.S. NATIONAL PHASE APPLICATION OF PCT INTERNATIONAL APPLICATION PCT/JP02/02951.

TECHNICAL FIELD

The present invention relates to a high frequency switch, a radio communication apparatus, and a high frequency switching method used, for example, in a mobile phone.

RELATED ART

In recent years, in view of the increasing number of users of mobile communication and globalization of a system, for example, high frequency switches have received attention. The high frequency switches are provided for using systems of EGSM, DCS, and PCS, which have corresponding frequency bands of FIG. 11, in a single mobile phone and so on. Besides, FIG. 11 is an explanatory drawing showing the corresponding frequency bands of EGSM, DCS, and PCS.

Here, referring to FIG. 12, which is a circuit diagram showing a conventional high frequency switch, the following will discuss the configuration and operation of the conventional high frequency switch used for a mobile phone and so on.

The conventional high frequency switch is provided for triple bands (the above-mentioned EGSM, DCS, and PCS) that comprises transmit-receive switches 121 and 122 and a branching filter circuit 123 for connecting the transmit-receive switches 121 and 122 to an antenna (ANT).

The transmit-receive switch 121 has a transmitting terminal Tx1 for transmitting EGSM and a receiving terminal Rx1 for receiving EGSM. The transmit-receive switch 122 has a transmitting terminal Tx2 for transmitting DCS and PCS, a receiving terminal Rx2 for receiving DCS, and a receiving terminal Rx3 for receiving PCS.

Additionally, the receiving terminal Rx3 is connected to the antenna via a diode D1, which is turned off upon transmission using the transmitting terminal Tx2.

However, in such a conventional high frequency switch, high frequency distortion is caused by the diode D1, which is turned off upon transmission using the transmitting terminal Tx2.

DISCLOSURE OF THE INVENTION

In view 6 of the above-mentioned problem, the present invention has as its object the provision of a high frequency switch, a radio communication apparatus, and a high frequency switching method with smaller high frequency distortion.

The $1^{st}$ aspect of the present invention is a high frequency switch, characterized by comprising:
a first transmit-receive switch which switches transmission and reception performed via a first transmitting terminal and first and second receiving terminals and has a first diode being turned off at the time of said transmission; and
a first low-pass filter for suppressing high frequency distortion caused by said first diode at the time of said transmission.

The $2^{nd}$ aspect of the present invention is the high frequency switch according to aspect 1,
characterized in that said first transmitting terminal is shared for two transmissions.

The $3^{rd}$ aspect of the present invention is the high frequency switch according to aspect 1 or 2,
characterized in that said first transmit-receive switch is connected to an antenna for performing said transmission and reception, and
said first low-pass filter is inserted between said first transmit-receive switch and said antenna.

The $4^{th}$ aspect of the present invention is the high frequency switch according to aspect 3,
characterized in that said first transmitting terminal is connected to said antenna via a second diode and said first low-pass filter, said diode being in a forward direction at the time of said transmission,
a second low-pass filter is further provided, said second low-pass filter being inserted between said first transmitting terminal and an anode of said second diode to suppress high frequency distortion occurring at the time of said transmission, and
said second low-pass filter suppresses high frequency distortion occurring at the time of said transmission, in cooperation with said first low-pass filter.

The $5^{th}$ aspect of the present invention is the high frequency switch according to aspect 1,
characterized in that said first transmit-receive switch is connected to an antenna for performing said transmission and said reception,
said first receiving terminal is connected to said antenna via said first diode, and
said first low-pass filter is inserted between said first diode and said antenna.

The $6^{th}$ aspect of the present invention is the high frequency switch according to any one of inventions aspects 1 to 5, further comprising:
a second transmit-receive switch for switching transmission and reception performed via transmitting terminal and receiving terminal; and
branching filter means of connecting said first transmit-receive switch and said second transmit-receive switch to said antenna.

The $7^{th}$ aspect of the present invention is a high frequency switch, characterized in that said high frequency switch comprises:
a plurality of transmit-receive switches for switching transmission and reception performed via transmitting terminals and receiving terminals; and
branching filter means of connecting said plurality of transmit-receive switches to an antenna, and
said receiving terminals are each connected to said antenna and are each grounded via a diode in a forward direction and a ground resistor, and
said ground resistor used for grounding is shared by a single resistor.

The $8^{th}$ aspect of the present invention is the high frequency switch according to aspect 7,
characterized in that among said receiving terminals, (1) a receiving terminal for reception using the lowest frequency band is connected to said ground resistor via an inductor, and (2) a receiving terminal for reception using the highest frequency band is connected to said ground resistor while bypassing said inductor.

The $9^{th}$ aspect of the present invention is the high frequency switch according to aspect 8,
characterized in that said inductor for connecting said receiving terminal to said ground resistor has a predetermined value or more of inductance for suppressing infiltration of a signal from said transmitting terminal to said receiving terminal, said receiving terminal performing reception using the lowest frequency band.

The 10$^{th}$ aspect of the present invention is the high frequency switch according to aspect 7,
characterized in that said ground resistor is grounded via an inductor.

The 11$^{th}$ aspect of the present invention is the high frequency switch according to aspect 10,
characterized in that said inductor is formed by using a via hole conductor.

The 12$^{th}$ aspect of the present invention is a high frequency switch, characterized in that said high frequency switch comprises:
a first transmit-receive switch which switches transmission and reception performed via a first transmitting terminal and first and second receiving terminals and has a first diode being turned off at the time of said transmission;
a first low-pass filter for suppressing high frequency distortion caused by said first diode at the time of said transmission;
a second transmit-receive switch for switching transmission and reception performed via a third transmitting terminal and a third receiving terminal; and
branching filter means of connecting said first and second transmit-receive switch to an antenna, and
said second and third receiving terminals are connected to said antenna and are grounded respectively via a diode in a forward direction and a ground resistor, and
said ground resistor used for grounding is shared by a single resistor.

The 13$^{th}$ aspect of the present invention is the frequency switch according to any one of aspects 1 to 12,
characterized in that a plurality of strip lines and a plurality of capacitors are formed on a plurality of dielectric layers, a via hole conductor is formed for forming said plurality of strip lines and said plurality of capacitors between said dielectric layers, and at least one of a diode, a capacitor, a resistor, and an inductor is mounted on a laminate formed by stacking said dielectric layers.

The 14$^{th}$ aspect of the present invention is the high frequency switch according to any one of aspects 1 to 6, and 12,
characterized in that a plurality of strip lines and a plurality of capacitors are formed on a plurality of dielectric layers, a via hole conductor is formed for forming said plurality of strip lines and said plurality of capacitors between said dielectric layers, at least one of a diode, a capacitor, a resistor, and an inductor is mounted on a laminate formed by stacking said dielectric layers, and
a first strip line constituting said first low-pass filter is formed on a first dielectric layer of said plurality of dielectric layers, a ground electrode is formed via a second dielectric layer disposed on one of the sides of said first dielectric layer, and no electrode pattern of a strip line other than said first strip line is disposed on the other side of said first strip line.

The 15$^{th}$ aspect of the present invention is the high frequency switch according to aspect 13 or 14,
characterized in that a SAW filter is mounted on a surface layer of said laminate.

The 16$^{th}$ aspect of the present invention is a radio communication apparatus, characterized by comprising:
a transmission circuit for performing said transmission;
a reception circuit for performing said reception; and
a high frequency switch according to any one of aspects 1 to 15, said switch being used for switching said transmission or said reception.

The 17$^{th}$ aspect of the present invention is a high frequency switching method, characterized by comprising:
a switching step of switching transmission and reception by using a first transmit-receive switch having a first diode which is turned off at the time of said transmission, said transmit-receive switch being used for switching transmission and reception performed via a first transmitting terminal and first and second receiving terminals; and
a filtering step of performing filtering by using a first low-pass filter for suppressing high frequency distortion caused by said first diode at the time of said transmission.

The 18$^{th}$ aspect of the present invention is a high frequency switching method, characterized in that said high frequency switching method comprises:
a switching step of switching transmission and reception by using a plurality of transmit-receive switches for switching transmission and reception performed via transmitting terminals and receiving terminals, and
said receiving terminals are each connected to an antenna and are respectively grounded via a diode in a forward direction and ground resistors, said plurality of transmit-receive switches being connected to said antenna via branching filter means, and
said ground resistors used for grounding are shared by a single resistor.

The 19$^{th}$ aspect of the present invention is a high frequency switching method characterized in that said high frequency switching method comprises:
a first switching step of switching transmission reception by using a first transmit-receive switch having a first diode which is turned off at the time of said transmission, said transmit-receive switch being used for switching transmission and reception performed via a first transmitting terminal and first and second receiving terminals,
a filtering step of performing filtering by using a first low-pass filter for suppressing high frequency distortion caused by said first diode at the time of said transmission; and
a second switching step of switching transmission and reception by using a second transmission reception switching circuit for switching transmission and reception performed via a third transmitting terminal and a third receiving terminal, and
said second and third receiving terminals are connected to an antenna and are respectively grounded via a diode in a forward direction and a ground resistor, said first and second transmit-receive switches being connected to said antenna via branching filter means, and
said ground resistors used for grounding are shared by a single resistor.

DESCRIPTION OF SYMBOLS 1, 2 Switch circuit
3 Branching filter means (branching filter circuit)
20 Antenna terminal
21, 22 Internal terminal
11-13 Low-pass filter (LPF)

BEST MODE FOR CARRYING OUT THE INVENTION

Embodiments of the present invention will be discussed in accordance with the accompanied drawings.

Embodiment 1

Figure 1:
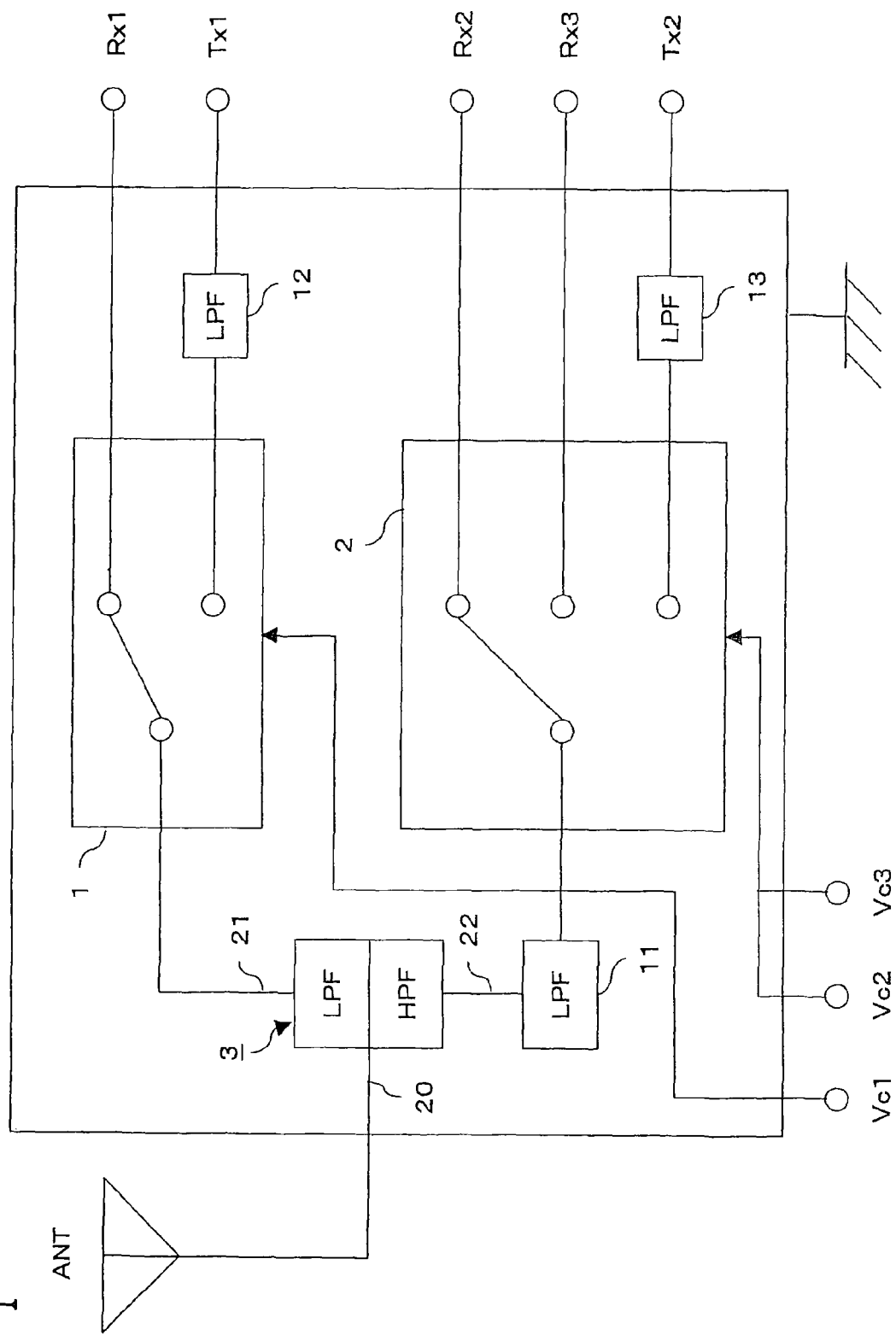
FIG. 1 is a block diagram showing a high frequency switch according to Embodiment 1 of the present invention.

First, mainly referring to FIG. 1, a configuration of a high frequency switch will be discussed according to the present embodiment. Here, FIG. 1 is a block diagram showing a high frequency switch of the present embodiment.

The high frequency switch of the present embodiment is a triple-band high frequency switch that has a filtering function of passing a transmission frequency band and a reception frequency band in a first frequency band (EGSM), a second frequency band (DCS), and a third frequency band (PCS). The high frequency switch comprises switch circuits (transmit-receive switches) 1 and 2 and branching filter means (branching filter circuit) 3. Additionally, as will be discussed later, the high frequency switch of the present embodiment is characterized in that a low-pass filter (LPF) 11 is inserted between the branching filter means 3 and the switch circuit 2.

Next, each means of the high frequency switch of the present embodiment will be discussed more specifically.

The branching filter means 3 has internal terminals 21 and 22, an antenna terminal 20 for making connection with an antenna (ANT), a low-pass filter (LPF) which connects the internal terminal 21 and the antenna terminal 20 and passes a first frequency band, and a high-pass filter (HPF) which connects the internal terminal 22 and the antenna terminal 20 and passes second and third frequency bands.

The switch circuit 1 is means connected to the internal terminal 21 of switching between a transmitting terminal Tx1 used for transmitting a first frequency band and a receiving terminal Rx1 used for receiving the first frequency band. Here, between the switch circuit 1 and the transmitting terminal Tx1, a low-pass filter (LPF) 12 is inserted for reducing high frequency distortion caused by amplification upon transmission using the transmitting terminal Tx1.

The switch circuit 2 is means connected to the internal terminal 22 of switching between a transmitting terminal Tx2 used for transmitting transmission frequency bands of the second and third frequency bands (shared for two transmissions), a receiving terminal Rx2 used for receiving a reception frequency band of the second frequency band, and a receiving terminal Rx3 used for receiving a reception frequency band of the third frequency band. Besides, between the switch circuit 2 and the transmitting terminal Tx2, a low-pass filter (LPF) 13 is inserted for reducing high frequency distortion caused by amplification upon transmission using the transmitting terminal Tx2.

Figure 2:
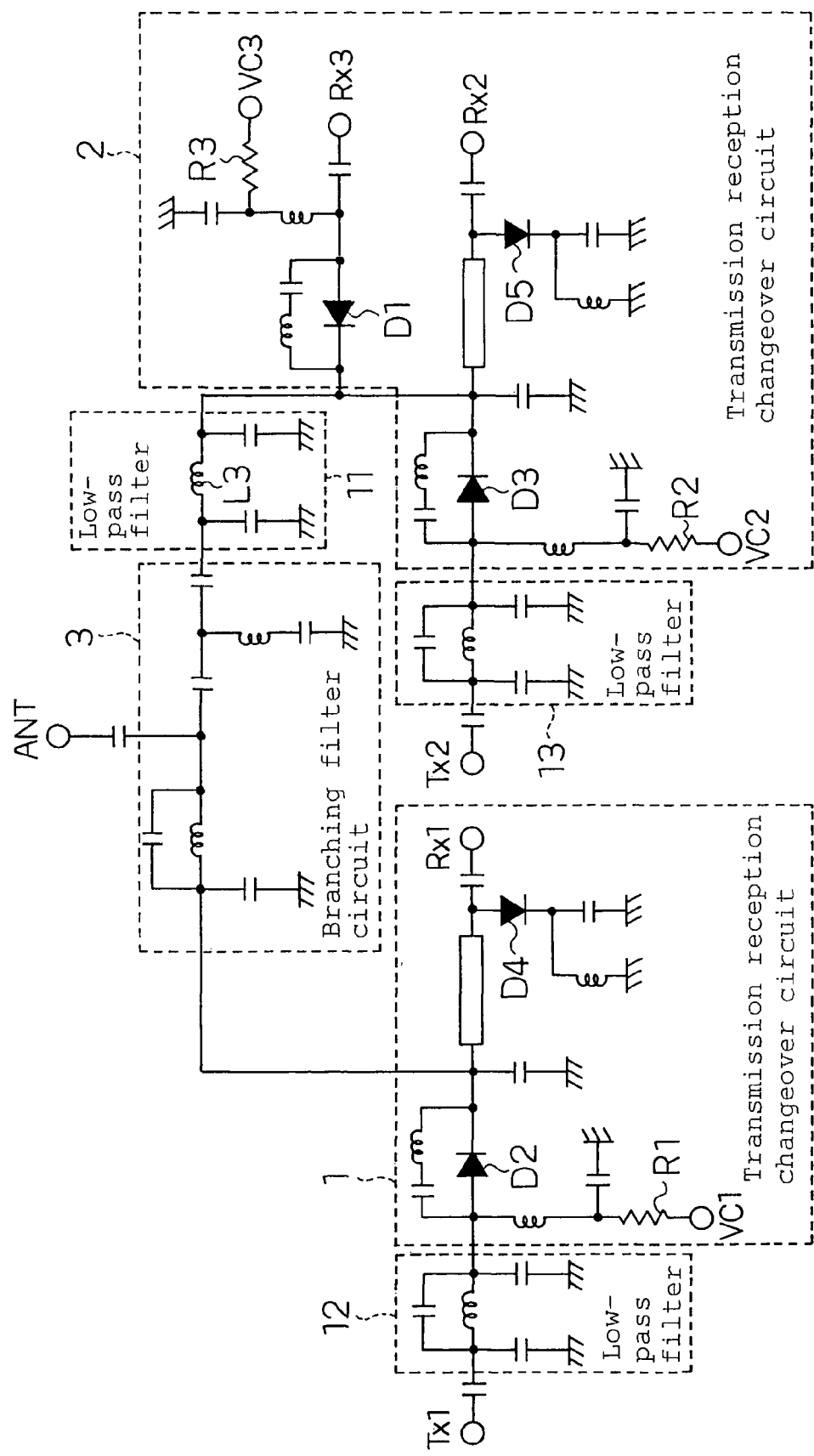
FIG. 2 is a circuit diagram showing the high frequency switch according to Embodiment 1 of the present invention.

Referring to FIG. 2, the following will discuss the circuit configuration of the high frequency switch according to the present embodiment. Here, FIG. 2 is a circuit diagram showing the high frequency switch of the present embodiment.

The transmitting terminal Tx1 is connected to the side of the antenna via a diode D2, which is made forward upon transmission, and the low-pass filter 12 is inserted between the transmitting terminal Tx1 and the anode of the diode D2. Further, the receiving terminal Rx1 is connected to the side of the antenna and is grounded via a diode D4 in a forward direction. Moreover, a control terminal VC1 is connected to a voltage control unit (omitted in the drawing) via a resistor R1.

The transmitting terminal Tx2 is connected to the side of the antenna via a diode D3, which is made forward upon transmission, and a low-pass filter 13 is inserted between the transmitting terminal Tx2 and the anode of the diode D3. Further, the receiving terminal Rx2 is connected to the side of the antenna and is grounded via a diode D5 in a forward direction. Moreover, the receiving terminal Rx3 is connected to the side of the antenna via a diode D1, which is directed in a reverse direction (off state) upon transmission using the transmitting terminal Tx2. Besides, the diode D1 is in a forward direction from the receiving terminal Rx3 to the antenna. Moreover, a control terminal VC2 is connected to a voltage control unit (omitted in the drawing) via a resistor R2, and a control terminal VC3 is connected to a voltage control unit (omitted in the drawing) via a resistor R3.

Additionally, a low-pass filter 11 is inserted between the branching filter means 3 and the switch circuit 2 so as to suppress high frequency distortion generated by the diode D1 upon transmission using the transmitting terminal Tx2.

Additionally, the characteristics of the low-pass filter 13 are set so as to suppress high frequency distortion, which occurs upon transmission using the transmitting terminal Tx2 in cooperation with the low-pass filter 11.

Figure 13:
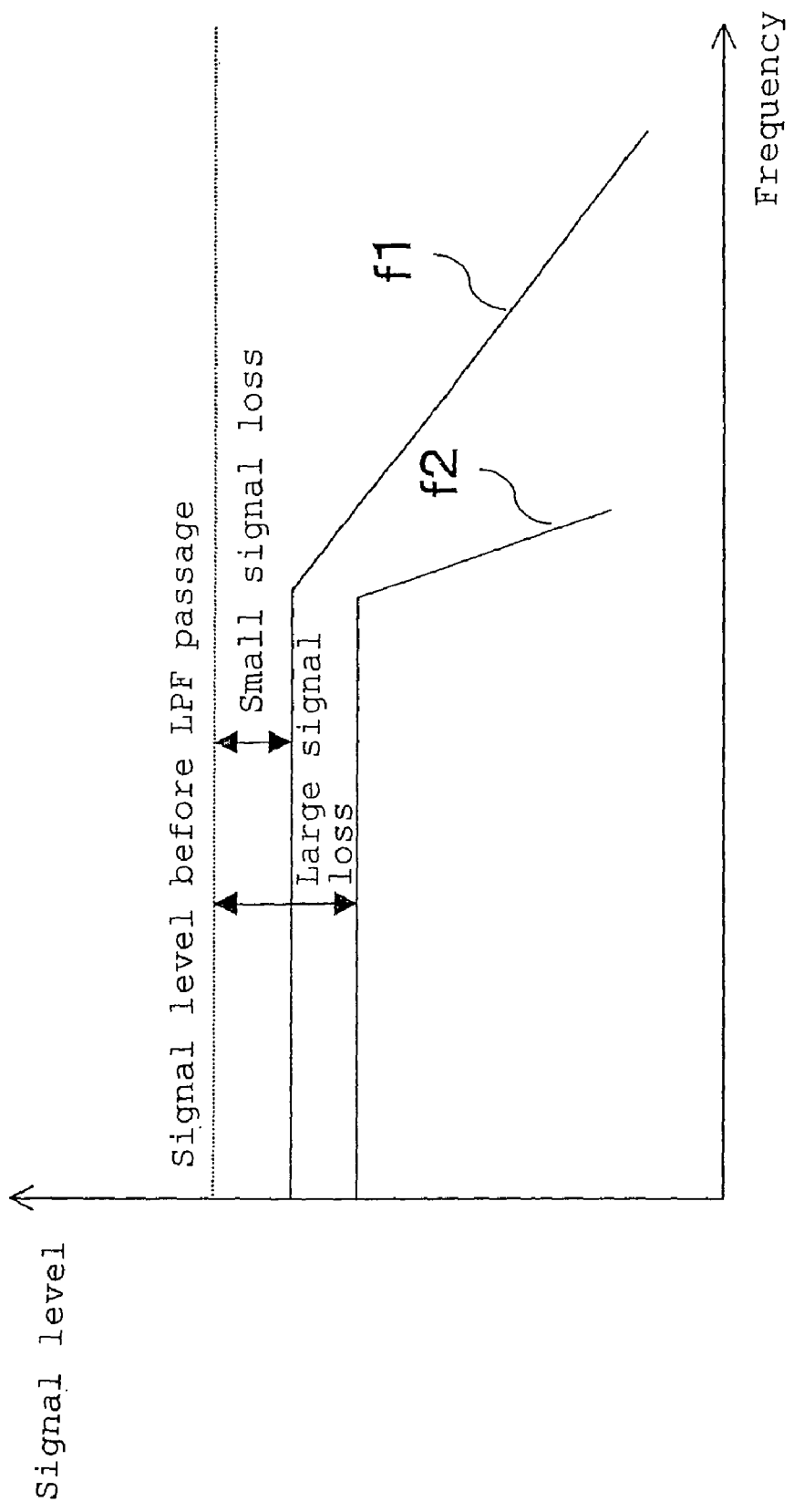
FIG. 13 is an explanatory drawing showing characteristics of a low-pass filter.

To be specific, the low-pass filter 13 has characteristics indicated by a characteristic curve f1 of FIG. 13, which is an explanatory drawing showing the characteristics of the low-pass filter. Namely, since a high frequency band is cut in cooperation with the low-pass filter 11, regarding the characteristics of the low-pass filter 13, smaller signal loss in spite of somewhat poor capability, which is indicated by a characteristic curve f1, is more desirable than excellent capability with large signal loss, which is indicated by a characteristic curve f2. The low-pass filter has larger signal loss as the filter improves in capability.

Additionally, the transmitting terminal Tx2 corresponds to a first transmitting terminal of the present invention, the receiving terminals Rx2 and Rx3 respectively correspond to second and first receiving terminals of the present invention, the diodes D1 and D3 respectively correspond to first and second diodes of the present invention, the low-pass filters 11 and 13 respectively correspond to first and second low-pass filters of the present invention, and the switch circuit 2 corresponds to a first transmit-receive switch. Further, the switch circuit 1 corresponds to a second transmit-receive switch of the present invention. Moreover, the branching filter means 3 corresponds to branching filter means of the present invention.

The following will discuss the operation of the high frequency switch according to the present embodiment. Besides, the following will discuss an embodiment of a high frequency switching method of the present invention as well as the operation of the high frequency switch of the present embodiment (similarly in the following embodiments).

Figure 12:
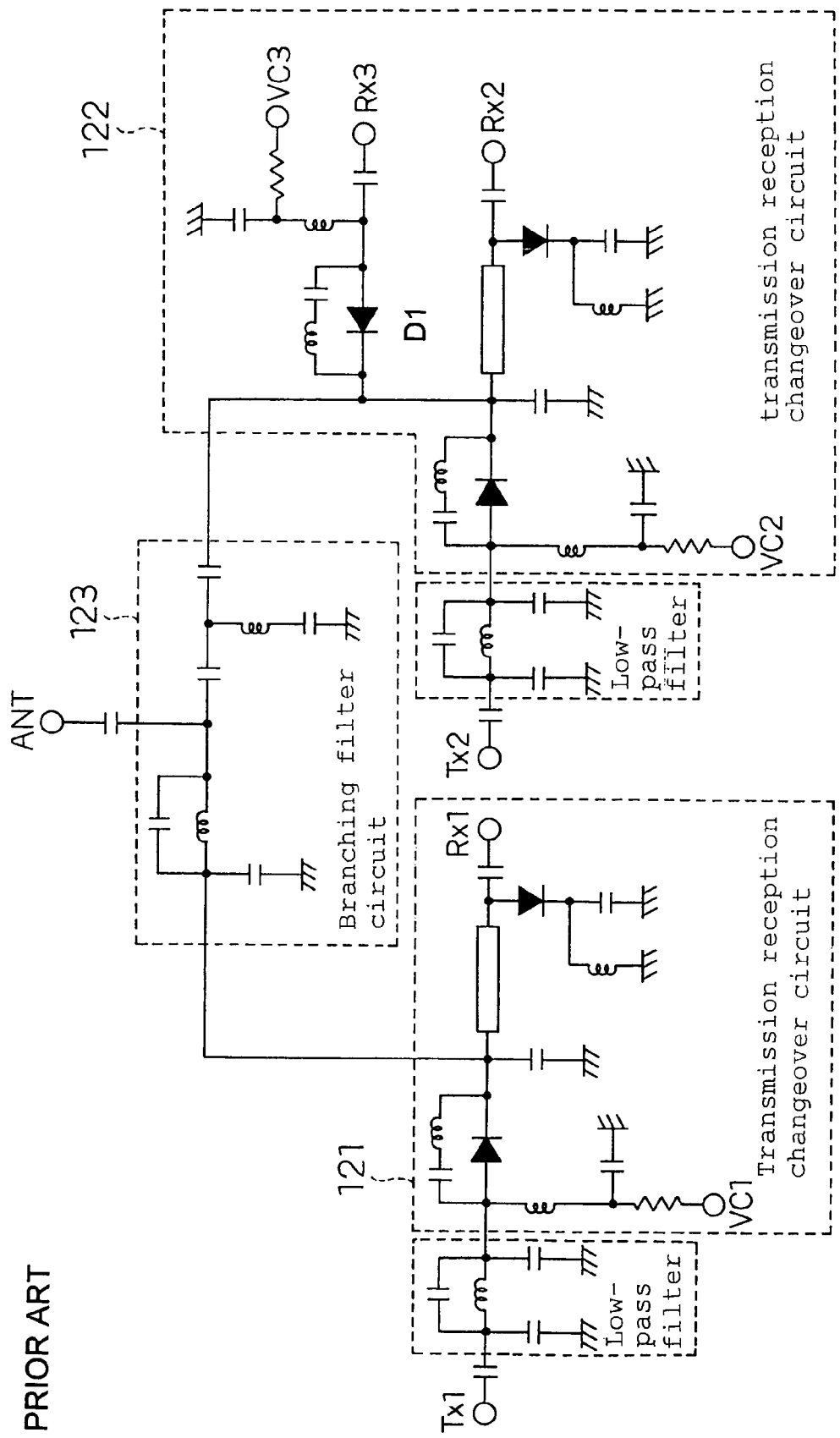
FIG. 12 is a circuit diagram showing a conventional high frequency switch.

The operation of the high frequency switch of the present embodiment has some similarities to that of the conventional high frequency switch shown in FIG. 12. Thus, the following will discuss a case in which transmission is performed by using the transmitting terminal Tx2 so as to make full use of the low-pass filter 11, which is a main characteristic of the high frequency switch of the present embodiment.

The low-pass filter 13 removes high frequency distortion, which is caused by amplification, from a transmitted signal. The transmitted signal is amplified by an amplifier (omitted in the drawing) and is inputted from the transmitting terminal Tx2. The low-pass filter 13 outputs the transmitted signal, on which high frequency distortion is removed, to the switch circuit 2.

The switch circuit 2 is switched so as to perform transmission using the transmitting terminal Tx2 and outputs a transmitted signal, which is inputted from the low-pass filter 13, to the low-pass filter 11. However, on a transmitted signal outputted to the side of the antenna, high frequency distortion is caused by the diode D1, which is turned off because of the relationship with its signal path.

The low-pass filter 11 removes high frequency distortion, which is caused by the diode D1, from a transmitted signal inputted from the switch circuit 2, and outputs the transmitted signal, on which high frequency distortion is removed, to the branching filter means 3.

The branching filter means 3 outputs a transmitted signal, which is inputted from the low-pass filter 11, to the antenna, and the antenna transmits the transmitted signal as radio waves.

Thus, an antenna switch on the side of a high frequency band (2 GHz band) is used as the switched circuit 2 of one input and three outputs (SP3T), the low-pass filter 11 for suppressing only high frequency distortion is inserted between the antenna switch and the branching filter circuit 3 at the side of the antenna, the low-pass filter 13 connected to a transmission end is reduced in attenuation, and insertion loss is improved. Thus, distortion on an off-state diode can be suppressed while characteristics of the conventional ports are hardly deteriorated.

Embodiment 2

Figure 3:
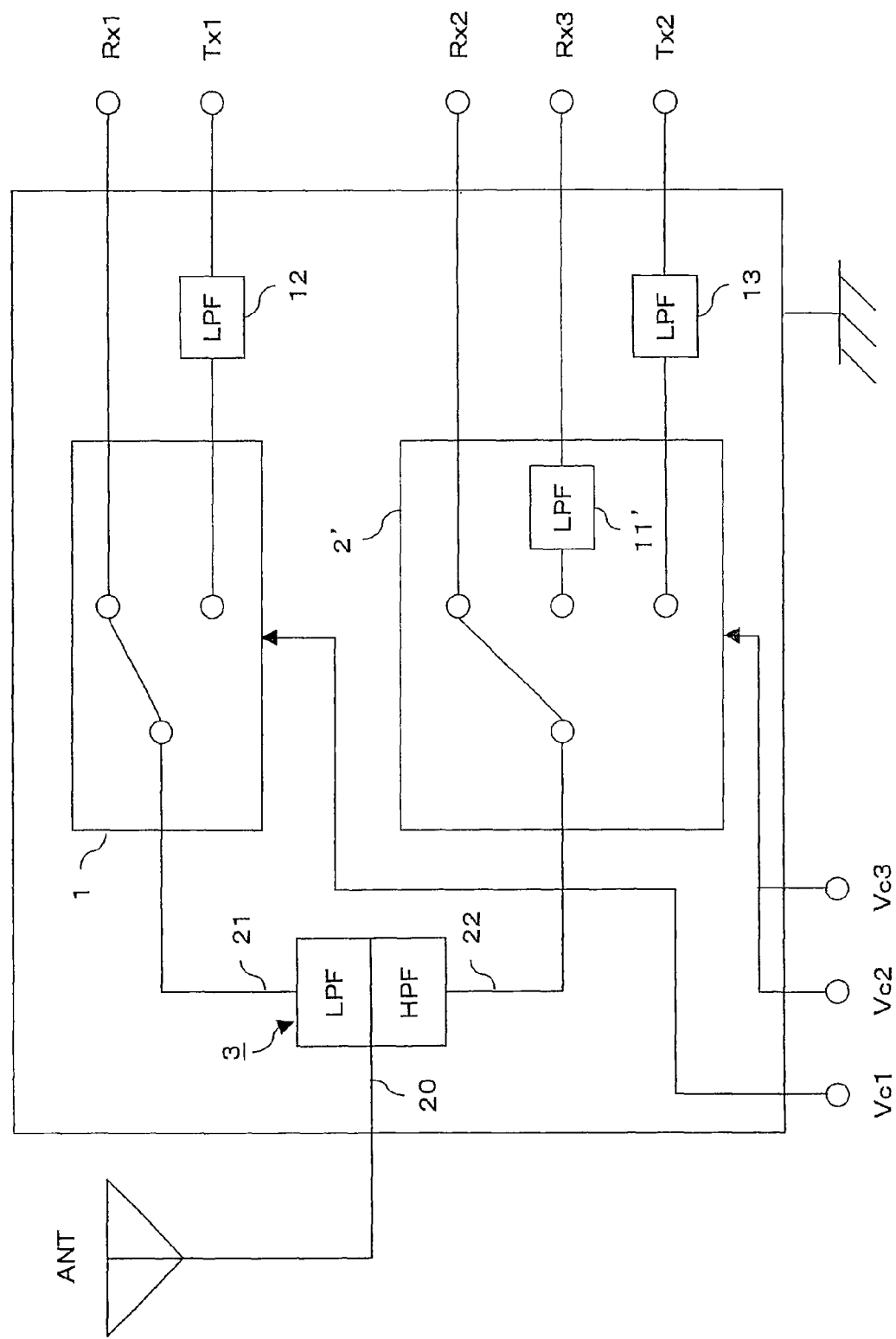
FIG. 3 is a block diagram showing a high frequency switch according to Embodiment. 2 of the present invention.
Figure 4:
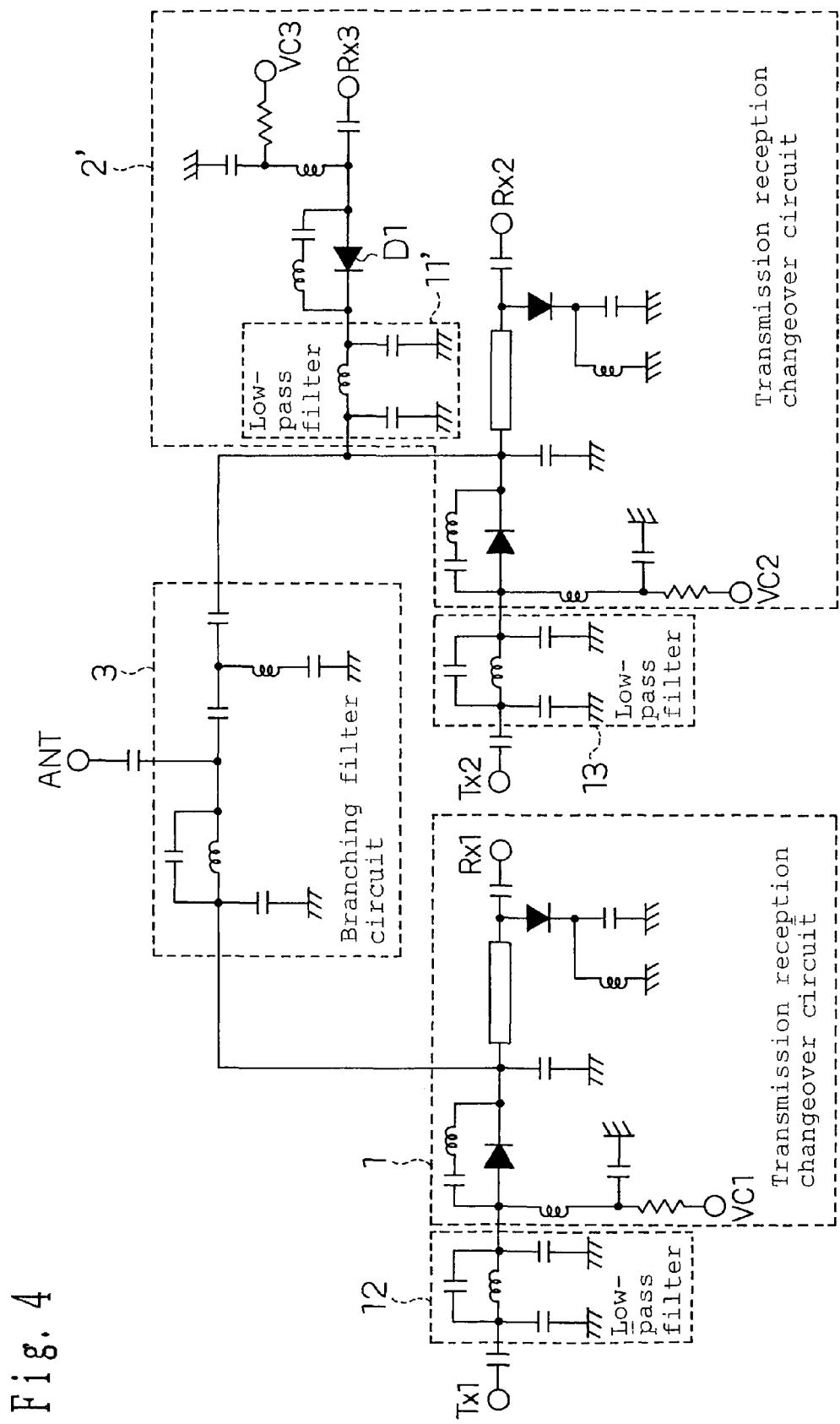
FIG. 4 is a circuit diagram showing the high frequency switch according to Embodiment 2 of the present invention.

Referring to FIGS. 3 and 4, the following will discuss the configuration and operation of a high frequency switch according to the present embodiment. Here, FIG. 3 is a block diagram showing the high frequency switch of the present embodiment, and FIG. 4 is a circuit diagram showing the high frequency switch of the present embodiment.

The configuration of the high frequency switch of the present embodiment is similar to that of the above-mentioned high frequency switch of Embodiment 1. However, in the high frequency switch of the present embodiment, a low-pass filter 11 is not inserted between branching filter means 3 and a switch circuit 2' but a low-pass filter 11' is inserted between the cathode of a diode D1 and an antenna (FIGS. 1 to 4). Additionally, in FIG. 4, the low-pass filter 11' is a part of the switch circuit 2'.

Therefore, the high frequency switch of the present embodiment can reduce a signal loss upon reception using a receiving terminal Rx2 while reducing high frequency distortion caused by the diode D1 upon transmission using the transmitting terminal Tx2. With the above-mentioned circuit configuration, the low-pass filter 11' is not disposed on a signal path of a received signal outputted from the receiving terminal Rx2. Hence, signal loss hardly occurs upon reception using the receiving terminal Rx2.

Additionally, the low-pass filter 11' corresponds to a first low-pass filter of the present invention, and the switch circuit 2' corresponds to a first transmit-receive switch of the present invention.

Embodiment 3

Figure 5:
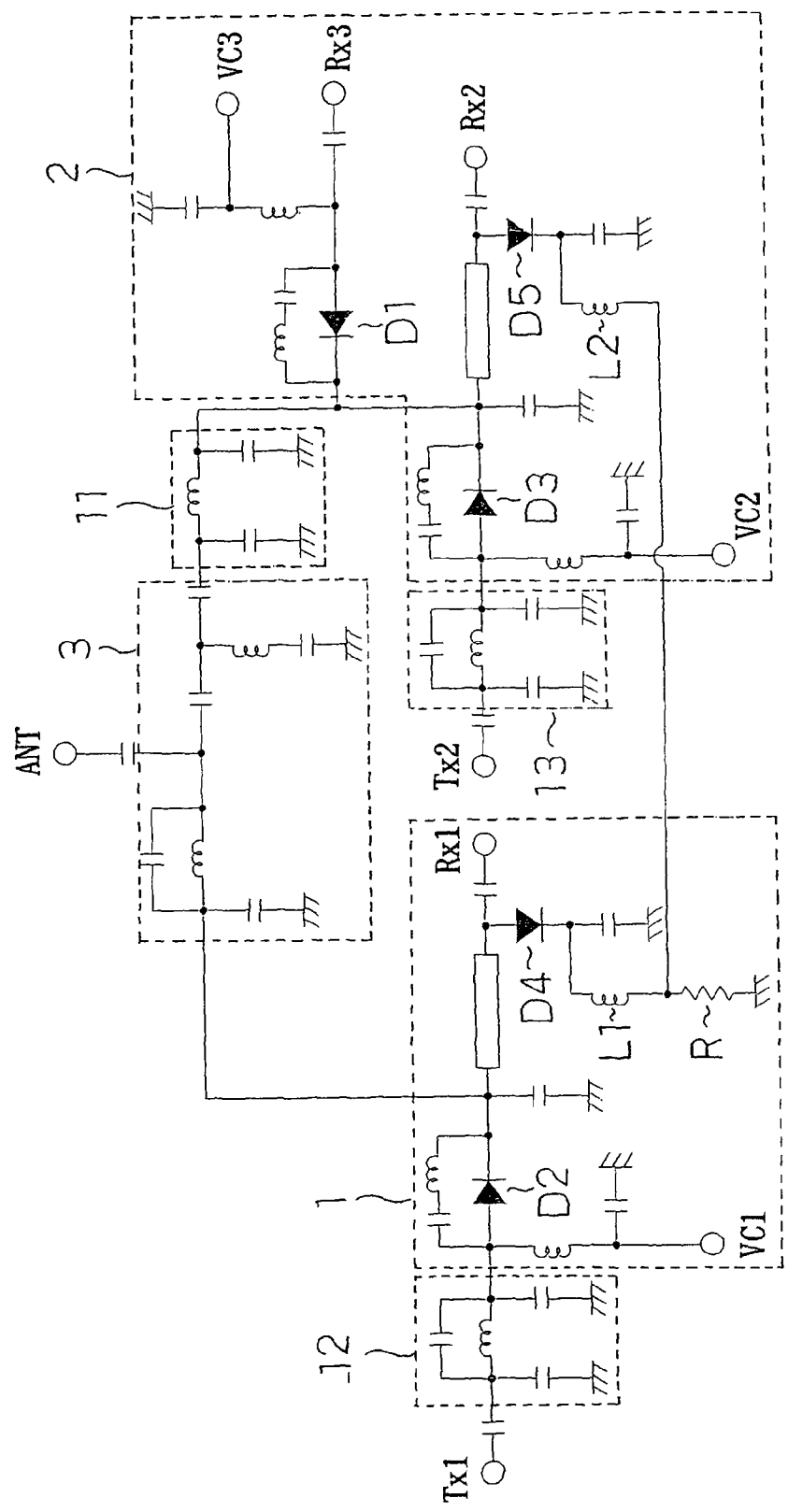
FIG. 5 is a circuit diagram showing a high frequency switch according to Embodiment 3 of the present invention.
Figure 6:
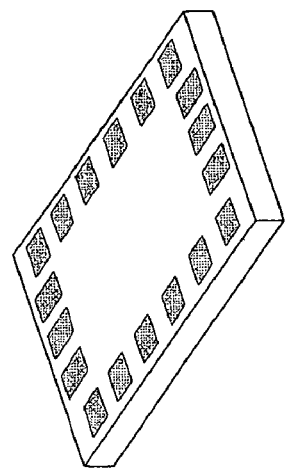
FIG. 6(a) is an explanatory drawing showing the high frequency switch (front) according to Embodiment 3 of the present invention.
FIG. 6(b) is an explanatory drawing showing the high frequency switch (back) according to Embodiment 3 of the present invention.
Figure 6:
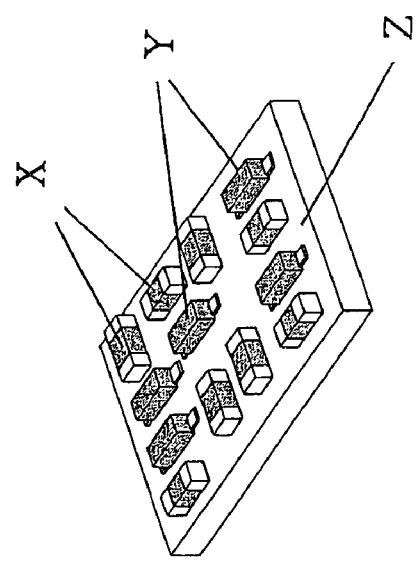

Referring to FIG. 5 and FIGS. 6(a) and 6(b), the following will discuss the configuration and operation of a high frequency switch according to the present embodiment. Here, FIG. 5 is a circuit diagram showing the high frequency switch of the present embodiment. Further, FIG. 6(a) is an explanatory drawing showing the high frequency switch (front) of the present embodiment, and FIG. 6(b) is an explanatory drawing showing the high frequency switch (back) of the present embodiment.

The configuration of the high frequency switch of the present embodiment is similar to that of the above-mentioned high frequency switch of the Embodiment 1. However, in the high frequency switch of the present embodiment, resistors R1 to R3 (FIG. 2) respectively connected to control terminals VC1 to VC3 are not included, and receiving terminals Rx1 and Rx2 are grounded via diodes D4 and D5 in a forward direction and a shared control resistor R (FIGS. 2 and 5).

Hence, the high frequency switch of the embodiment can (1) reduce high frequency distortion caused by the diodes D1, D3, and D5 upon transmission using a transmitting terminal Tx1, and (2) reduce high frequency distortion caused by diodes D2 and D4 upon transmission using a transmitting terminal Tx2. With the above-mentioned circuit configuration, since reverse bias voltage is applied, the diodes D1, D3, and D5 (resp. diodes D2 and D4) hardly generate high frequency distortion upon transmission using the transmitting terminal Tx1 (resp. transmitting terminal Tx2).

Additionally, in the high frequency switch of the present embodiment, as shown in FIGS. 6(a) and 6(b), chip components (resistor, inductor, and capacitor) X and a PIN diode Y are mounted on a surface layer of a multilayer board (including an inductor and a capacitor) Z.

Since the number of resistors can be reduced by two, current can be readily controlled by resistors. This is because a resistor of the diode is small enough to be negligible as compared with a control resistor and current substantially depends only upon a control resistor. Further, reliability of component packaging is improved and the device can be smaller in size due to the reduced number of components. Additionally, although connection from the interior is necessary for mounting the resistors on the surface, due to reduced inner vias for connection, capacitive coupling is reduced and characteristics are improved.

Moreover, conventionally, when a two-path control terminal is turned on, a current value is about twice a current value obtained by turning on a single-path control terminal. The above-mentioned circuit of the present embodiment hardly increases a consumed current value and suppresses power consumption of the set.

Also, one terminal of a control resistor R is connected to GND from the cathodes of the diodes D4 and D5 via inductors L1 and L2 of 1/4λ (λ is wavelength) or more (FIG. 5). Thus, high frequency components from the ports are interrupted, isolation does not become lower, or characteristics are not deteriorated.

Also, reverse bias voltage is applied to the diode of the off-side transmit-receive switch which is not performing transmission, capacitive coupling is reduced by a change in a depletion layer. Thus, isolation is improved, leakage power is reduced, and the characteristics are improved. Moreover, even when power is applied to the diode which is turned off upon transmission, spurious is suppressed.

Here, the control resistor R corresponds to a ground resistor of the present invention.

Embodiment 4

Figure 14:
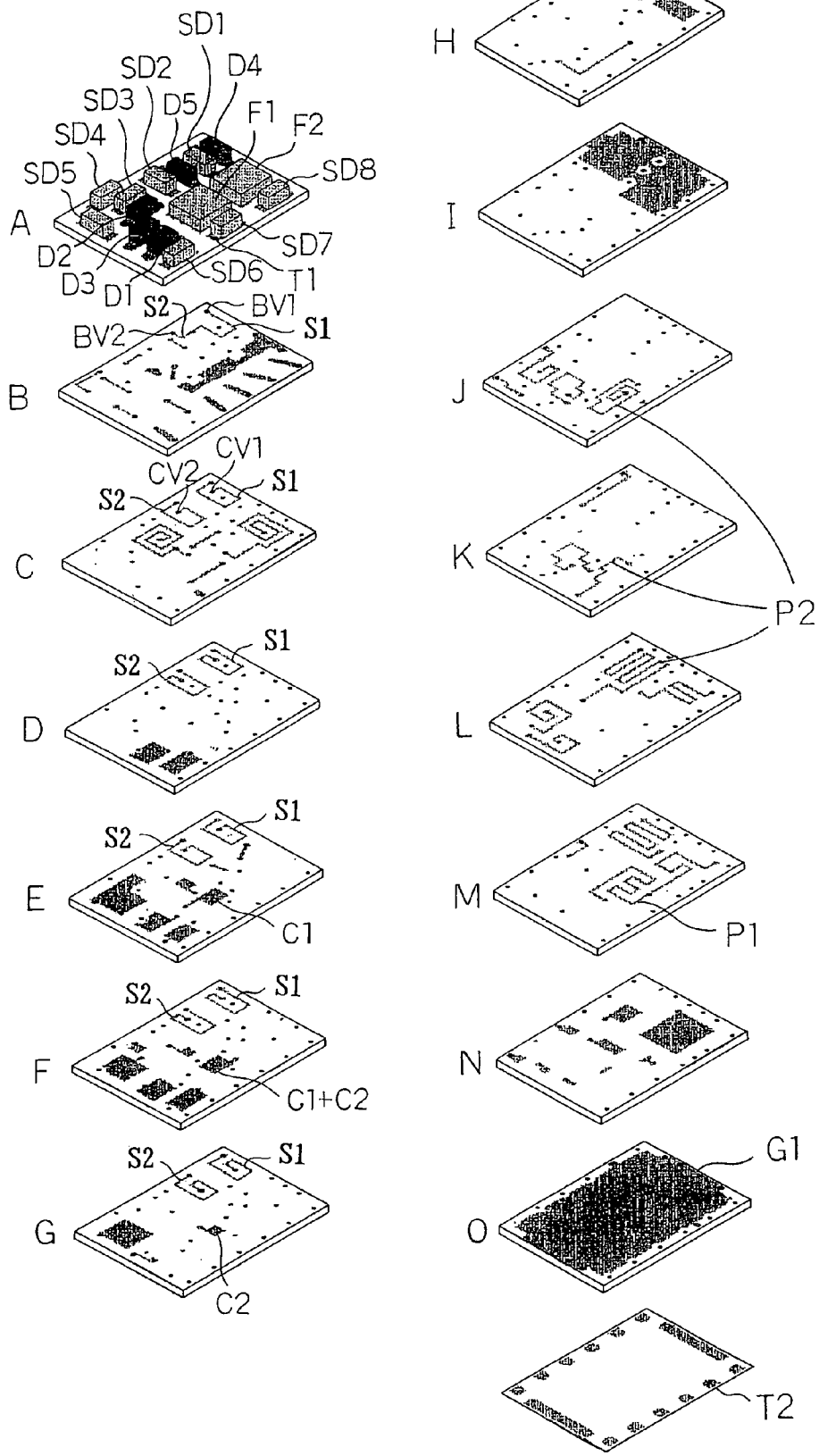
FIG. 14 is an exploded perspective view showing a high frequency switch according to Embodiment 4 of the present invention.

Referring to FIG. 14, the following will discuss the configuration of a high frequency switch according to the present embodiment. Additionally, FIG. 14 is an exploded perspective view showing the high frequency switch of the present embodiment. Here, a surface under a dielectric layer O in FIG. 14 is the back of the dielectric layer O.

The configuration of the high frequency switch of the present embodiment is similar to that of the high frequency switch of Embodiment 1. The mounting structure will be specifically discussed.

In FIG. 14, the high frequency switch of the present embodiment is composed of fifteen dielectric layers A to O. Here, the number of dielectric layers is optionally selected depending upon demanded characteristics of the high frequency switch.

On the upper surface of a laminate, which has a lamination structure including various strip lines and capacitors that constitute the high frequency switch, two SAW filters F1 and F2, five diodes D1 to D5, and chip components SD1 to SD8 such as a capacitor are mounted via terminals T1, which are formed on the upper surface of the laminate, and are electrically connected to an internal circuit of the laminate.

Besides, as the dielectric layer, a so-called glass ceramic substrate is applicable, in which low-melting glass frit is mixed with ceramic powder such as forsterite. Further, on green sheets formed by slurry obtained by mixing an organic binder and an organic solvent with the ceramic powder, a number of via holes for electrically connecting multilayer wiring are bored by punching or laser beam machining.

Printing is carried out by using conductive paste having silver (gold or copper) powder as a main component of a conductor to form wiring patterns on a predetermined green sheet, and conductive paste is printed and filled in the via holes for making interlayer connection between the wiring patterns of the green sheets. Thus, the strip lines and capacitor electrodes are formed.

The fifteen layers of green sheets are positioned and stacked accurately, and the layers are increased in temperature and pressure under a certain condition, so that an integrated laminate can be obtained. After the laminate is dried, the organic binder in the green sheet is burned out by performing burning at 400 to 500° C. in a kiln in an oxidizing atmosphere. Burning is carried out around at 850 to 950° C., (1) in ordinary air when gold or silver powder is used as a main component of the conductor, and (2) in an inert gas or reduction atmosphere when copper powder is used as a main component of the conductor. In this manner, a final laminate can be obtained.

A plurality of terminals T1 for mounting the SAW filters and diodes are formed on the upper surface of the dielectric layer A. A plurality of terminals T2 for surface-mounting the high frequency switch on a main substrate of electronic equipment are formed on the back of the dielectric layer O, on which a ground electrode G1 is formed. Here, the terminals T1 and T2 are formed by printing and patterning the above-mentioned conductive paste.

The following will discuss the layered structure of the wiring patterns in the high frequency switch having such a lamination structure.

For example, a strip line electrode pattern on the dielectric layer B makes interlayer connection with a strip line pattern on the dielectric layer C through via holes BV1 and BV2. Further, the strip line electrode pattern on the dielectric layer C makes interlayer connection with a strip line pattern on the dielectric layer D through via holes CV1 and CV2. In this manner, for example, strip lines S1 and S2 are connected sequentially through the six layers of the dielectric layers B to G through the via holes.

Further, for example, capacitors C1 and C2 are connected in series by providing an electrode pattern of the capacitor C1 on the dielectric layer E, an electrode pattern shared by the capacitors C1 and C2 on the dielectric layer F, and an electrode pattern of the capacitor C2 on the dielectric layer G.

The strip lines and capacitors are configured thus. The input/output terminals of the high frequency switch of the present embodiment are all gathered on the back of the dielectric layer 0 through the via holes. Thus, a mounting area can be smaller when the switch is mounted on the main substrate of the electronic equipment.

The above explanation discussed the detail of Embodiments 1 to 4.

Additionally, the first transmitting terminal of the present invention is a terminal shared for two transmissions in the above-mentioned embodiments. The present invention is not limited to the above-mentioned terminal. For example, the terminal may be used only for a single transmission or for connecting a duplexer.

Figure 7:
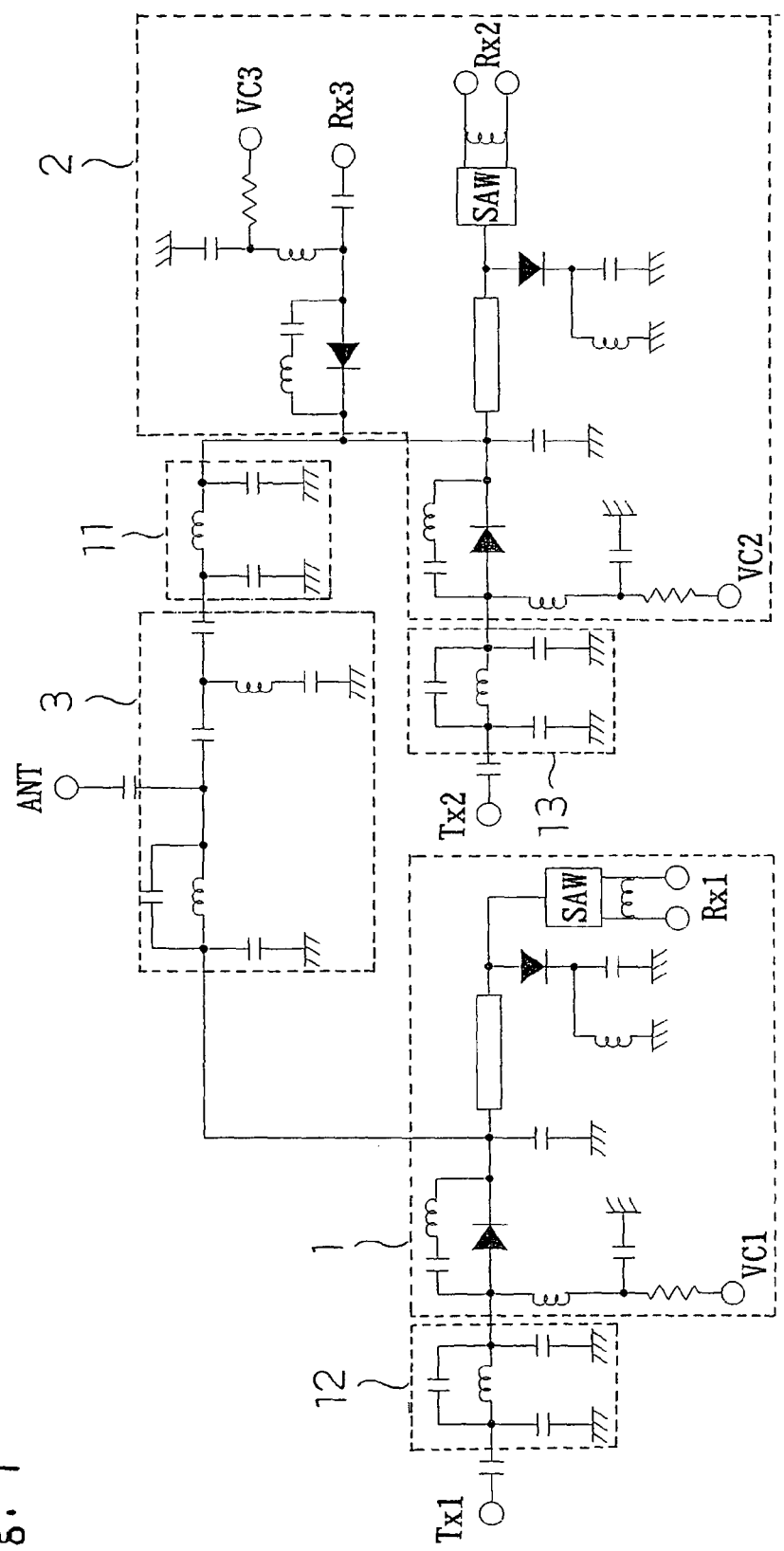
FIG. 7 is a circuit diagram showing a high frequency switch in which a low-pass filter is provided for suppressing high frequency distortion caused by a diode in an off state, and SAW filters are mounted on receiving terminals Rx1 and Rx2.
Figure 8:
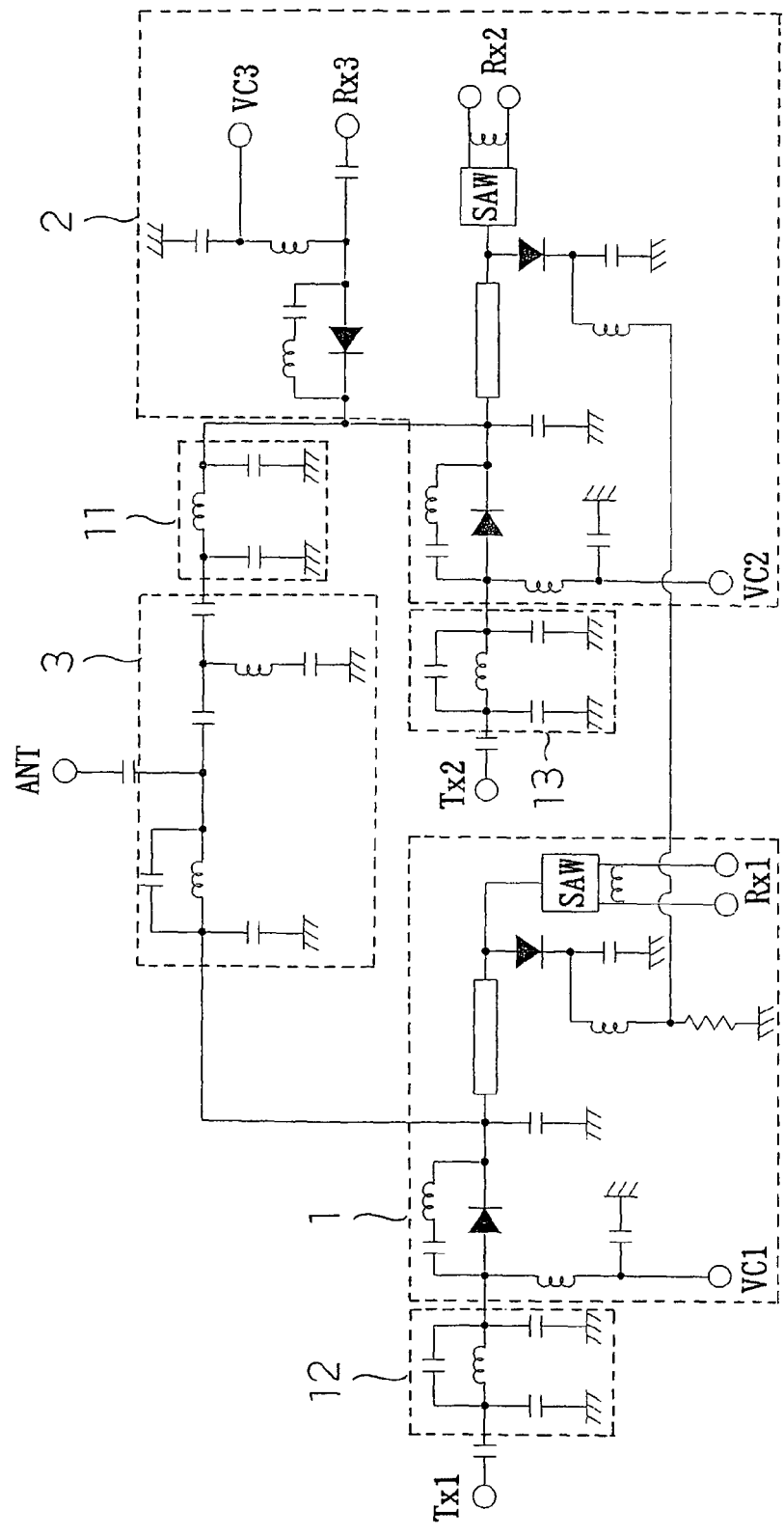
FIG. 8 is a circuit diagram showing a high frequency switch in which a resistor shared by a plurality of transmit-receive switches is further provided, and SAW filters are mounted on receiving terminals Rx1 and Rx2.
Figure 9:
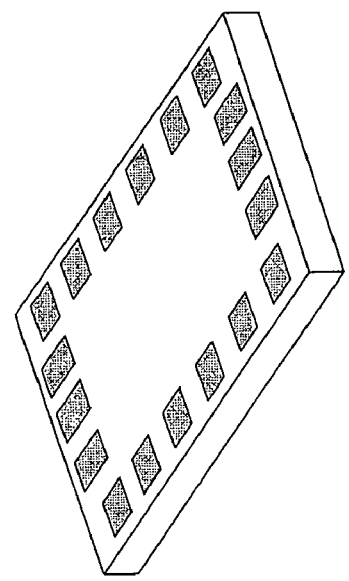
FIG. 9(a) is an explanatory drawing showing a high frequency switch (front) having SAW filters mounted according to the present invention.
FIG. 9(b) is an explanatory drawing showing the high frequency switch (back) having the SAW filters mounted according to the present invention.
Figure 9:
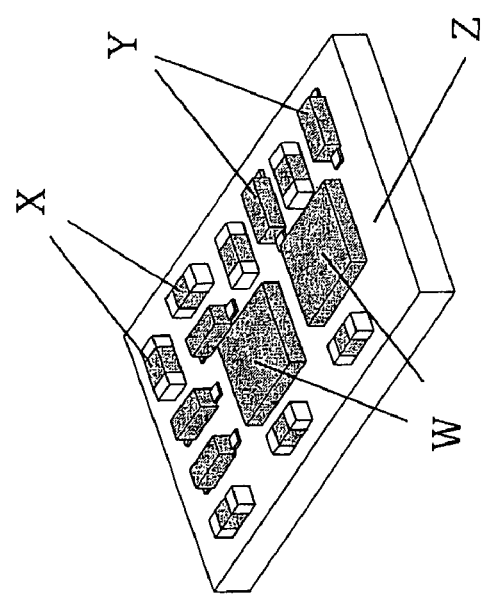

Moreover, for example, as shown in FIGS. 7, 8, and FIGS. 9(a) and 9(b), the SAW filter W as well as the chip components (resistor, inductor, capacitor) X and the PIN diode Y may be mounted on a surface layer of the multilayer board (including an inductor and a capacitor) Z in the high frequency switch of the present invention. Here, FIG. 7 is a circuit diagram showing a high frequency switch in which a low-pass filter is provided for suppressing high frequency distortion caused by a diode in an off state and SAW filters are mounted on receiving terminals Rx1 and Rx2. FIG. 8 is a circuit diagram further showing a high frequency switch in which a resistor is shared by a plurality of transmit-receive switches and SAW filters are mounted on receiving terminals Rx1 and Rx2. Moreover, FIG. 9(a) is an explanatory drawing showing a high frequency switch (front) where SAW filters are mounted. FIG. 9(b) is an explanatory drawing showing the high frequency switch (back) where the SAW filters are mounted.

Figure 10:
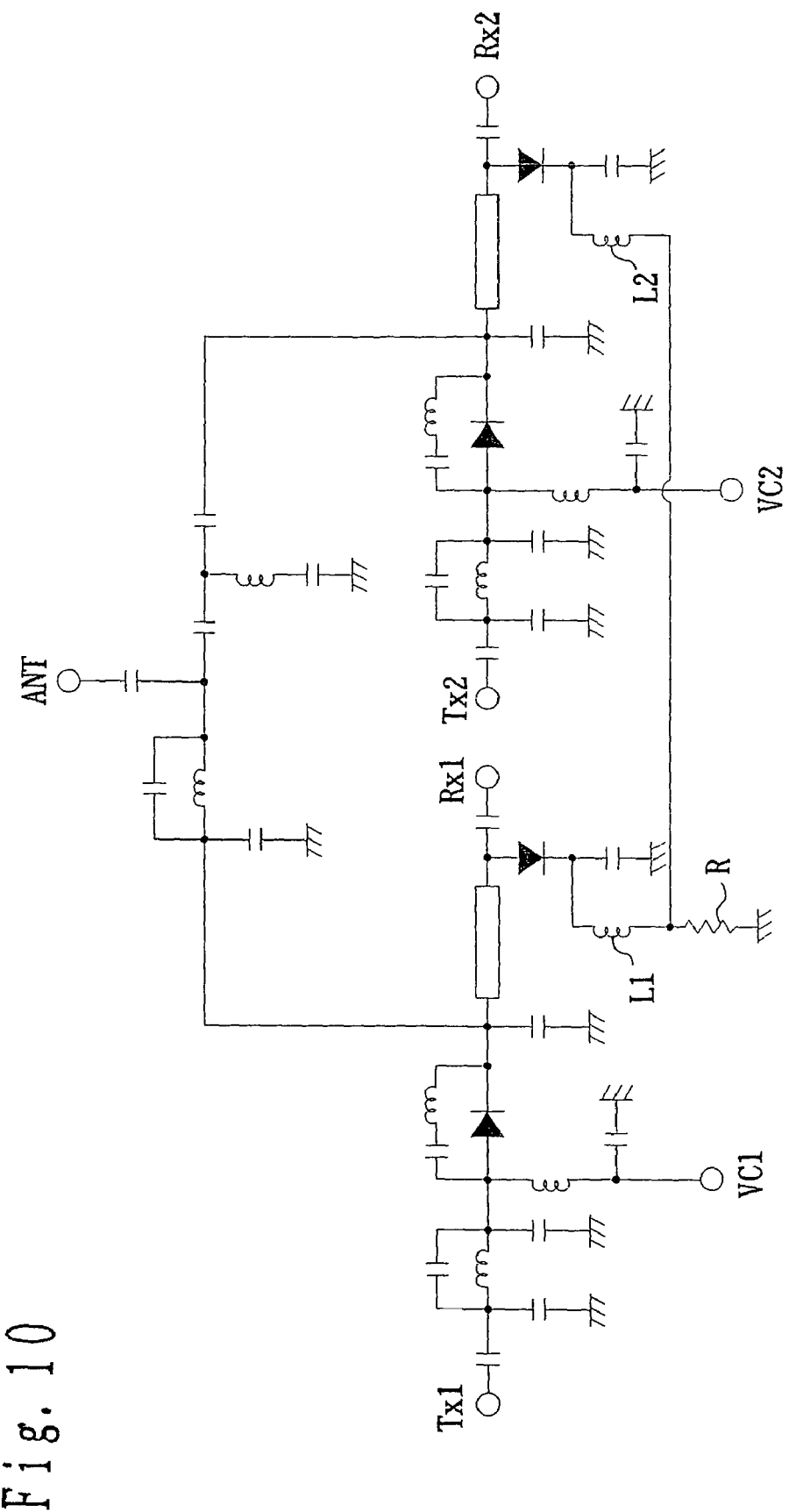
FIG. 10 is a circuit diagram showing a high frequency switch with dual bands of the present invention.
Figure 11:
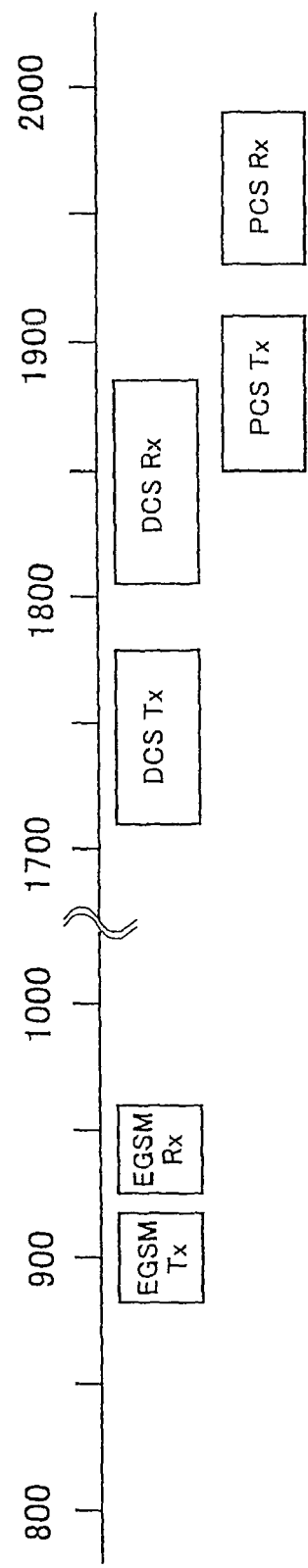
FIG. 11 is an explanatory drawing showing corresponding frequency bands of EGSM, DCS, and PCS.

Besides, in the above-mentioned embodiments, the high frequency switch of the present invention is a triple-band high frequency switch. The present invention is not limited to the above-mentioned switch. For example, as shown in FIG. 10, which is a circuit diagram showing a dual-band high frequency switch, a dual-band high frequency switch is also applicable.

Figure 15:
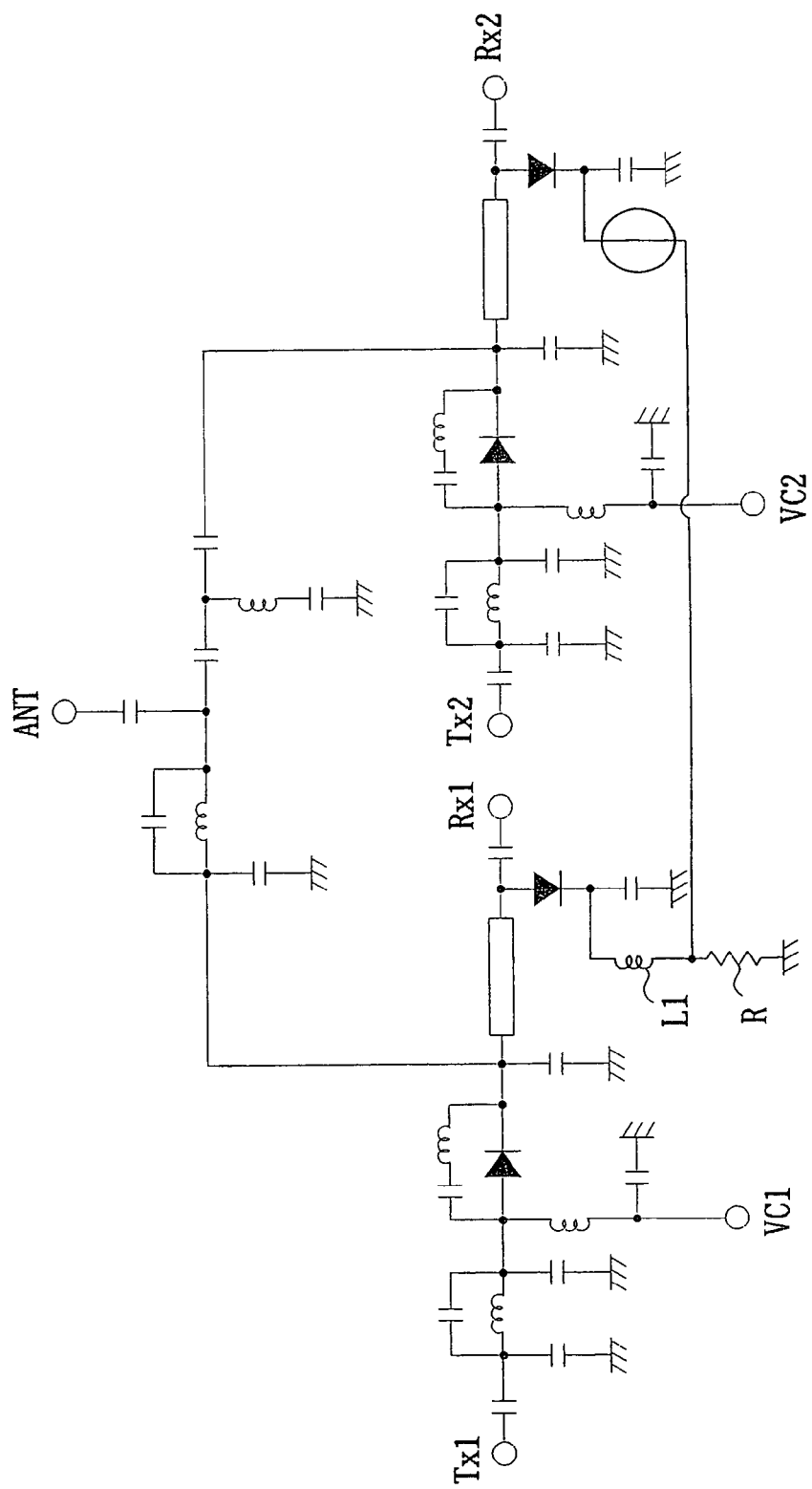
FIG. 15 is a circuit diagram showing a high frequency switch with dual bands that has reduced resistors and inductors according to the present invention.

Here, in the switch circuit (FIG. 10) of a low frequency band that has the transmitting terminal Tx1 and the receiving terminal Rx1, the inductor L2 may be omitted. To be specific, as shown in FIG. 15, which is a circuit diagram showing the dual-band high frequency switch of the present invention where resistors and inductors are omitted, regarding the receiving terminal Rx1 and Rx2, (1) the receiving terminal Rx1 for performing reception using the lowest frequency band is connected to the ground resistor R via the inductor L, and (2) the receiving terminal Rx2 for performing reception using the highest frequency band may be connected to the ground resistor R while bypassing the inductor (an oval mark is added on the corresponding part to indicate that the inductor L2 is omitted). Since the inductor L has sufficiently large inductance (e.g., equal to inductance of the inductor L2 (FIG. 10)), when transmission is performed by using the transmitting terminal Tx1 as well, a transmitted signal does not infiltrate to the receiving terminal Rx2, so that polarity can be formed on a low-frequency side of a passband.

Figure 16:
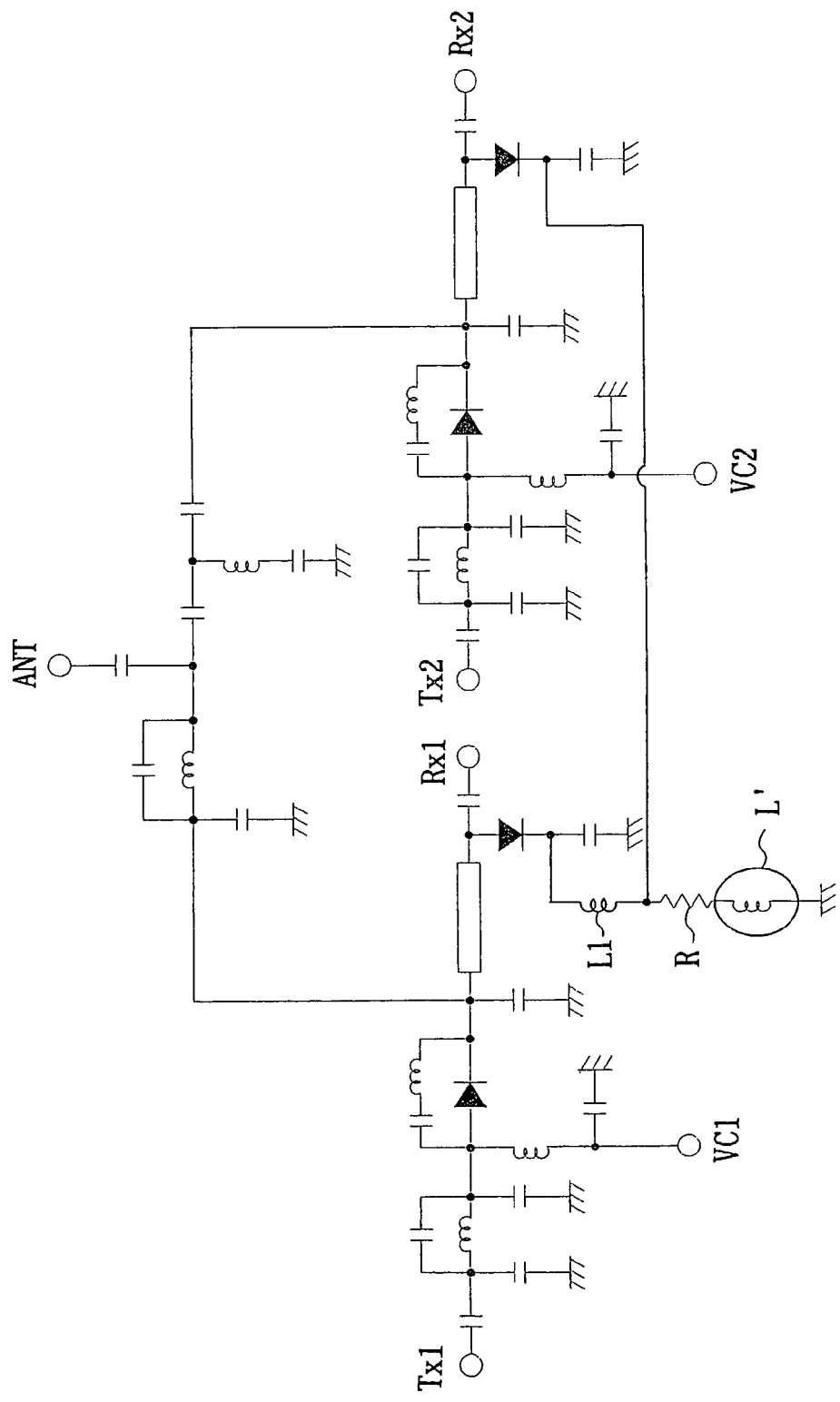
FIG. 16 is a circuit diagram showing a high frequency switch with dual bands that has reduced resistors and an inductor formed between a ground resistor and a ground point according to the present invention.

Further, in the switch circuit (FIG. 10) of a low frequency band that has the transmitting terminal Tx1 and the receiving terminal Rx1, an inductor may be formed between the resistor R and a ground point (ground electrode). To be specific, as shown in FIG. 16, which is a circuit diagram showing a dual-band high frequency switch which has reduced resistors and an inductor formed between a ground resistor and a ground point, a ground resistor R may be grounded via an inductor L' (an oval mark is added on the corresponding part to indicate the formation of the inductor L'). Since a chalk coil having sufficient inductance is formed by using the inductor L', when transmission is performed using the transmitting terminal Tx1 as well, a transmitted signal does not infiltrate to the receiving terminal Rx2 or a transmitted signal is not supplied to the ground. Thus, an open state can be achieved by a high frequency.

Figure 17:
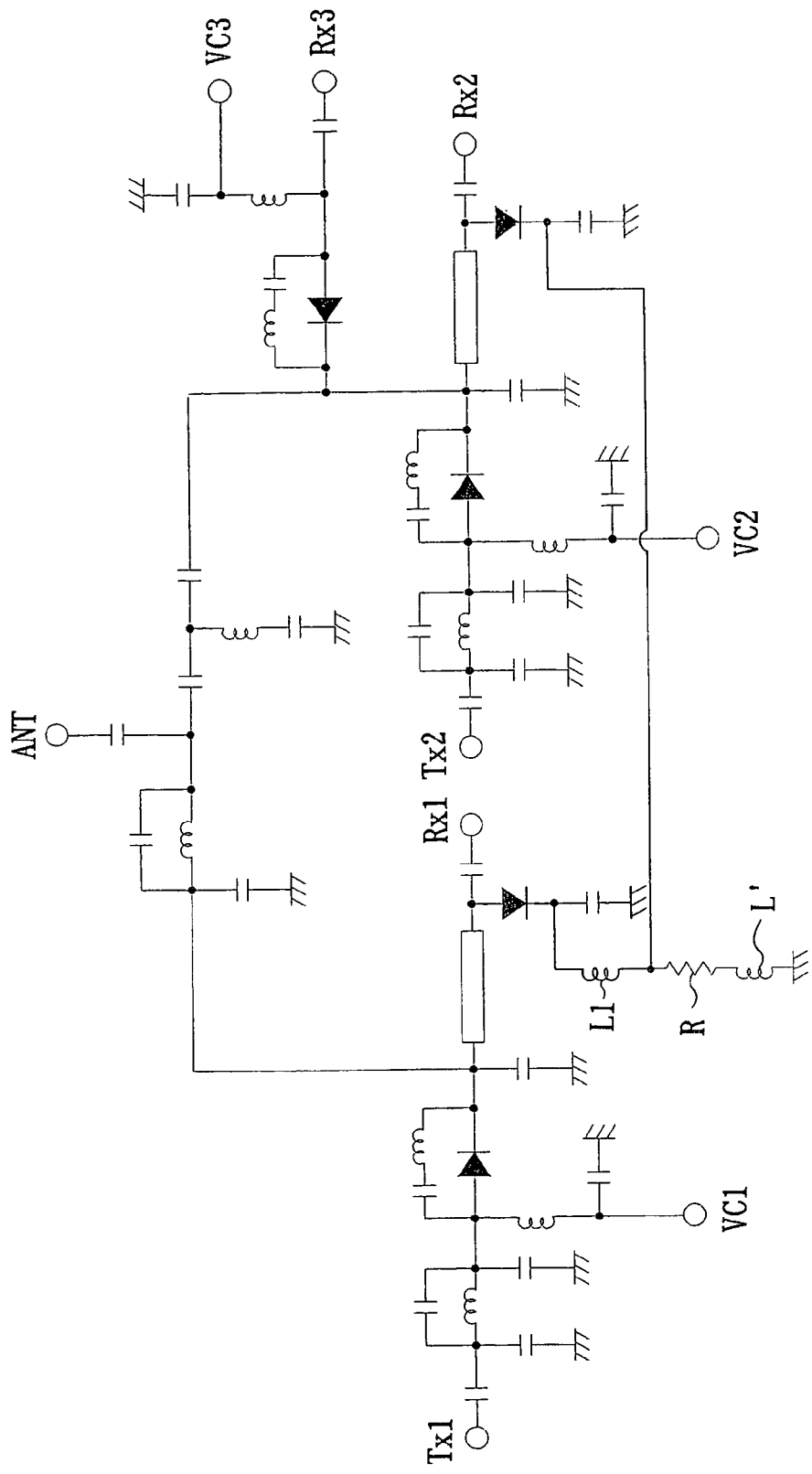
FIG. 17 is a circuit diagram showing a high frequency switch with triple bands that has reduced resistors and an inductor formed between a ground resistor and a ground point according to the present invention.

Needless to say, the above-mentioned configurations are similarly applicable to a triple-band high frequency switch in addition to a dual-band high frequency switch. Namely, a high frequency switch of FIG. 17 is also included in the present invention. FIG. 17 is a circuit diagram showing a triple-band high frequency switch of the present invention that has reduced resistors and an inductor formed between a ground resistor and a ground point.

Figure 18:
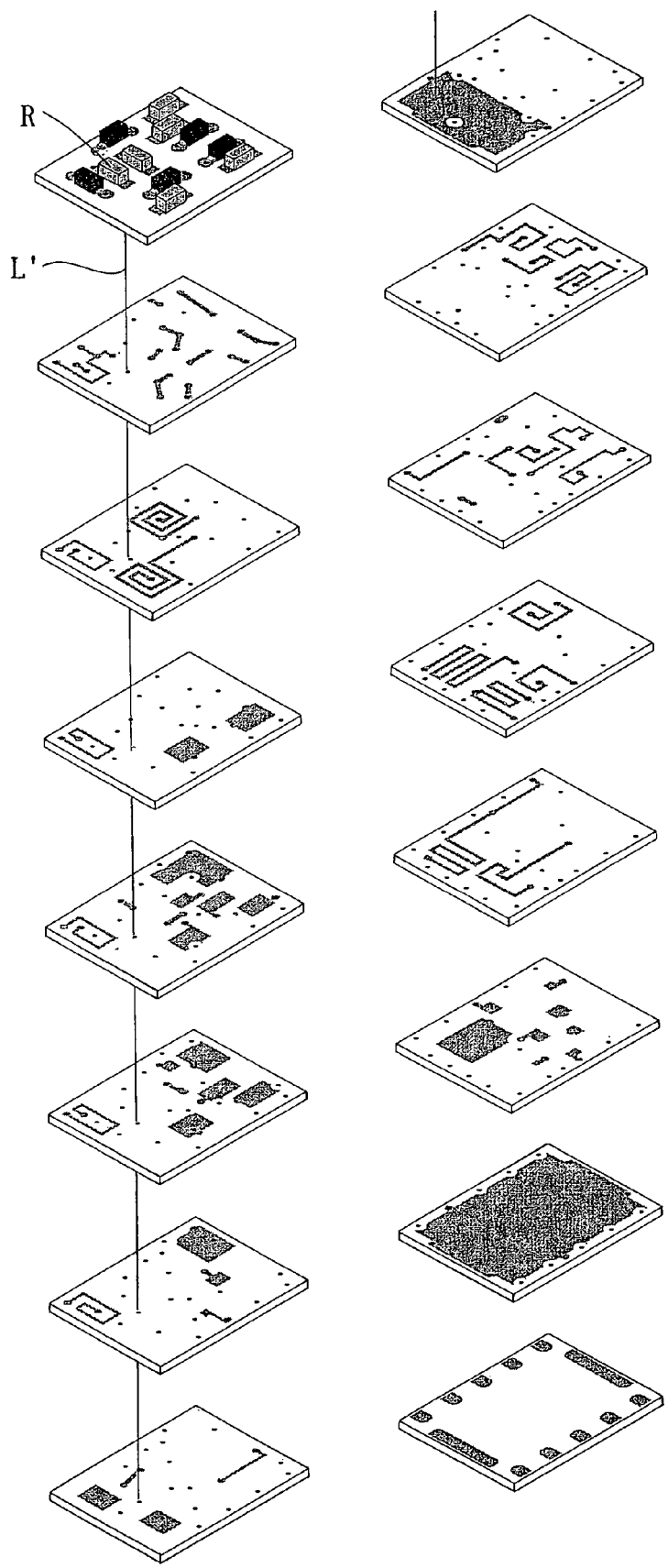
FIG. 18 is an exploded perspective view showing a high frequency switch with triple bands that has reduced resistors and an inductor formed between a ground resistor and a ground point.

Additionally, regarding such an inductor between the resistor R and the ground point, the component may be spontaneously formed by using a layered insertion pattern, a surface layer pattern, and so on without being mounted intentionally. To be specific, as shown in FIG. 18, which is an exploded perspective view showing the triple-band high frequency switch which has reduced resistors and an inductor formed between the ground resistor and the ground point, the inductor L' may be formed using a via hole conductor. It is surely desirable to provide a circuit pattern design in which such a via hole conductor is perpendicular to a substrate surface because a compact inductor is formed in a small area.

Moreover, in the above-mentioned Embodiments 1 and 2, the high frequency switch of the present invention comprises the low-pass filter for suppressing high frequency distortion caused by the diode in an off state. In the above-mentioned Embodiment 3, the high frequency switch of the present invention further comprises the resistor shared by a plurality of transmit-receive switches. The present invention is not limited to the above-mentioned embodiments. In short, the high frequency switch comprises (a) the low-pass filter for suppressing high frequency distortion caused by the diode in an off state and/or (b) the resistor shared by a plurality of transmit-receive switches.

As described above, for example, the present invention relates to a high frequency switch having a plurality of signal paths corresponding to a plurality of frequencies. The high frequency switch is constituted by a branching filter circuit, which couples transmitted signals from the plurality of signal paths upon transmission and distributes received signals to the plurality of signal paths upon reception, a plurality of transmit-receive switches for switching the plurality of signal paths between a transmitting section and a receiving section, and a plurality of filters disposed in the signal paths. The high frequency switch is characterized in that a first low-pass filter is disposed between the branching filter circuit and a first transmit-receive switch having four ports, which correspond to first and second communication systems having adjacent frequencies of the plurality of frequencies and are divided into a transmitting section shared by the first and second communication systems, a receiving section of the first communication system, and a receiving section of the second communication system, and a second low-pass filter is disposed in the transmitting section.

To be specific, for example, as shown in FIG. 14, the following configuration is also applicable: a ground electrode G1 is formed under an electrode pattern P1 of the inductor L3 (FIG. 2), which constitutes the low-pass filter 11 (FIG. 1), via the dielectric layers M and N, and electrode patterns P2 of other inductors are not disposed on the electrode pattern P1. Additionally, since stacking is carried out such that the dielectric layer A is the top surface layer and the dielectric layer O is the bottom layer, the dielectric layers A to L are disposed on the electrode pattern P1 and the dielectric layers M to O are disposed under the electrode pattern P1. Thus, the above-mentioned electrode patterns P2 of the other inductors are actually equivalent to all of the electrode patterns (indicated by thin lines in FIG. 14) of the inductors formed on the dielectric layers A to L.

In short, a plurality of strip lines and a plurality of capacitors are formed on a plurality of dielectric layers, via hole conductors for forming the plurality of strip lines and the plurality of capacitors are formed between the dielectric layers, and at least one of the diodes, capacitors, resistors, and inductors is formed on a laminate formed by stacking the dielectric layers.

Additionally, the triple-band high frequency switch is constituted by the inductors, capacities, diodes, and resistors (FIG. 2). When the switch is realized as a lamination device, silver or copper is used for a low-temperature sintering ceramic sheet to print electrode patterns constituting an inductor and a capacity, burning is simultaneously performed after stacking, and the diodes, resistors, (SAW filters), an inductor not being disposed in a layer, and a capacity are mounted on a surface layer. Thus, a lamination device is completed. Hence, it is possible to suppress signal loss caused by the low-pass filter 11, thereby preventing deterioration of characteristics in the entire device.

Further, the present invention relates to, for example, a high frequency switch characterized in that the first transmit-receive switch has the anode connected to the receiving section of the second communication system and the cathode connected to the branching filter circuit via the first low-pass filter.

Moreover, the present invention relates to a high frequency switch having a plurality of signal paths corresponding to a plurality of frequencies. The high frequency switch is constituted by a branching filter circuit, which couples transmitted signals from the plurality of signal paths upon transmission and distributes received signals to the plurality of signal paths upon reception, a plurality of transmit-receive switches for switching the plurality of signal paths between a transmitting section and a receiving section, and a plurality of filters disposed in the signal paths. The plurality of transmit-receive switches include a diode having the cathode grounded via a resistor, and the resistor is shared by at least two or more of the plurality of transmit-receive switches.

Also, in the present invention, for example, the plurality of transmit-receive switches are constituted by two transmit-receive switches. The high frequency switch is characterized in that a first transmit-receive switch is constituted by four ports divided into a transmitting section shared by first and second communication systems, a receiving section of the first communication system, and a receiving section of the second communication system, a second transmit-receive switch is constituted by three ports divided into a transmitting section of a third communication system and a receiving section of the third communication system, the first and second transmit-receive switches are connected to a branching filter circuit, and a low-pass filter is connected to the transmitting sections.

Besides, for example in the present invention, the plurality of transmit-receive switches are constituted by two transmit-receive switches. The high frequency switch is characterized in that a first transmit-receive switch comprises a first diode, which has the anode connected to a terminal of a (shared) transmission circuit of the first (second) communication system and the cathode connected to the branching filter circuit, a first strip line having one terminal connected to the anode of the first diode and the other terminal grounded via a first capacitor and connected to a first control terminal, a second diode having the anode connected to a terminal of a reception circuit of the first communication system and the cathode grounded via a parallel circuit of a second capacitor and a first resistor, a second strip line having one terminal connected to the anode of the second diode and the other terminal connected to the branching filter circuit, (a third diode having the anode connected to one terminal of a reception circuit of the second communication system and the cathode connected to the branching filter circuit, and a third strip line having one terminal connected to the anode of the third diode and the other terminal grounded via a third capacitor and connected to a second control terminal), and a second transmit-receive switch comprises a fourth diode having the anode connected to a terminal of a transmission circuit of the third communication system and the cathode connected to the branching filter circuit, a fourth strip line having one terminal connected to the anode of the fourth diode and the other terminal grounded via a fourth capacitor and connected to a third control terminal, a fifth diode having the anode connected to a terminal of a reception circuit of the third communication system and the cathode grounded via a parallel circuit of a fifth capacitor and a second resistor, and a fifth strip line having one terminal connected to the anode of the fifth diode and the other terminal connected to the branching filter circuit. Here, the words in the parentheses are indicated for a triple switch circuit.

Additionally, in the present invention, for example, the plurality of transmit-receive switches are constituted by two transmit-receive switches. The high frequency switch is characterized in that a first transmit-receive switch comprises a first diode, which has the anode connected to a terminal of a transmission circuit shared by the first and second communication systems and the cathode connected to the branching filter circuit, a first strip line having one terminal connected to the anode of the first diode and the other terminal grounded via a first capacitor and connected to a first control terminal, a second diode having the anode connected to a terminal of a reception circuit of the first communication system and the cathode grounded via a parallel circuit of a second capacitor and a first resistor, a second strip line having one terminal connected to the anode of the second diode and the other terminal connected to the branching filter circuit, a third diode having the anode connected to a terminal of a reception circuit of the second communication system and the cathode connected to the branching filter circuit, and a third strip line having one terminal connected to the anode of the third diode and the other terminal grounded via a third capacitor and connected to a second control terminal, and a second transmit-receive switch comprises a fourth diode having the anode connected to a terminal of a transmission circuit of the third communication system and the cathode connected to the branching filter circuit, a fourth strip line having one terminal connected to the anode of the fourth diode and the other terminal grounded via a fourth capacitor and connected to a third control terminal, a fifth diode having the anode connected to a terminal of a reception circuit of the third communication system and the cathode grounded via a parallel circuit of a fifth capacitor and a second resistor, and a fifth strip line having one terminal connected to the anode of the fifth diode and the other terminal connected to the branching filter circuit. The branching filter circuit is constituted by a low-pass filter and a high-pass filter. The second transmit-receive switch is connected to the low-pass filter and the first transmit-receive switch is connected to the high-pass filter.

Besides, the present invention also includes a radio communication apparatus which comprises a transmission circuit for transmission, a reception circuit for reception, and the above-mentioned high frequency switch used for switching transmission and reception. To be specific, in such a configuration of the radio communication apparatus, for example, the transmission circuit is connected to the transmitting terminal Tx1 (FIG. 1) of the high frequency switch via an amplifier.

As described above, the present invention offers an advantage in the provision of a high frequency switch, a radio communication apparatus, and a high frequency switching method for reducing high frequency distortion.

The invention claimed is:

1. A high frequency switch comprising:
a first transmit-receive switch which switches transmission and reception signals via a first transmitting terminal and first and second receiving terminals and has a first diode being turned off at the time of transmission;
a first low-pass filter suppressing high frequency distortion caused by said first diode at the time of said transmission;
a second transmit-receive switch for switching transmission and reception signals via a second transmitting terminal and a third receiving terminal; and
branching filter means of connecting said first and second transmit-receive switches to an antenna,
wherein said first transmitting terminal is connected to said antenna via a second diode and said first low-pass filter, said second diode being in a forward direction at the time of said transmission,
said second and third receiving terminals are connected to said antenna and are grounded respectively via a diode in a forward direction and a common ground resistor, and
a second low-pass filter is provided, said second low-pass filter being inserted between said first transmitting terminal and an anode of said second diode to suppress high frequency distortion occurring at the time of said transmission.

2. The frequency switch according to claim 1, wherein a plurality of strip lines and a plurality of capacitors are formed on a plurality of dielectric layers, a via hole conductor is formed for forming said plurality of strip lines and said plurality of capacitors between said dielectric layers, and at least one of a diode, a capacitor, a resistor, and an inductor is mounted on a laminate formed by stacking said dielectric layers.

3. The high frequency switch according to claim 1,
wherein a plurality of strip lines and a plurality of capacitors are formed on a plurality of dielectric layers, a via hole conductor is formed for forming said plurality of strip lines and said plurality of capacitors between said dielectric layers, at least one of a diode, a capacitor, a resistor, and an inductor is mounted on a laminate formed by stacking said dielectric layers, and
a first strip line constituting said first low-pass filter is formed on a first dielectric layer of said plurality of dielectric layers, a ground electrode is formed via a second dielectric layer disposed on one of the sides of said first dielectric layer, and no electrode pattern of a strip line other than said first strip line is disposed on the other side of said first strip line.

4. The high frequency switch according to claim 2, wherein a SAW filter is mounted on a surface layer of said laminate.

5. A radio communication apparatus comprising:
a transmission circuit for performing transmission;
a reception circuit for performing reception; and
the high frequency switch according claim 1, said switch being used for switching said transmission or said reception.

6. A high frequency switching method comprising:
a first switching step of switching transmission and reception signals using a first transmit-receive switch having a first diode which is turned off at the time of transmission, said transmit-receive switch being used for switching transmission and reception via a first transmitting terminal and first and second receiving terminals;
a filtering step of performing filtering using a first low-pass filter for suppressing high frequency distortion caused by said first diode at the time of said transmission;
a transmission step of using said first transmitting terminal, which is connected to an antenna via a second diode and said low-pass filter, said second diode being in a forward direction at the time of said transmission;
a second switching step of switching transmission and reception signals using a second transmission reception switching circuit for switching transmission and reception via a second transmitting terminal and a third receiving terminal; and
a suppressing step of suppressing high frequency distortion occurring at the time of said transmission using a second low-pass filter, said second low-pass filter being inserted between said first transmitting terminal and an anode of said second diode,
wherein said second and third receiving terminals are connected to said antenna and are respectively grounded via a diode in a forward direction and a common ground resistor, said first and second transmit-receive switches being connected to said antenna via branching filter means.

* * * * *